United States Patent [19]

Höglund

[11] E Patent Number: Re. 33,637

[45] Reissued Date of Patent: Jul. 16, 1991

[54] SEALING DEVICE FOR A PRESSURE FLUID CYLINDER WITHOUT PISTON ROD

[75] Inventor: Ingolf Höglund, Huddinge, Sweden

[73] Assignee: AB Mecman, Stockholm, Sweden

[21] Appl. No.: 127,888

[22] Filed: Dec. 2, 1987

Related U.S. Patent Documents

Reissue of:

[64] Patent No.: 4,555,980
Issued: Dec. 3, 1985
Appl. No.: 446,577
Filed: Dec. 3, 1982

[30] Foreign Application Priority Data

Dec. 22, 1981 [SE] Sweden ..... 8107724

[51] Int. Cl.[5] ..... F01B 29/00

[52] U.S. Cl. ..... 92/88; 277/DIG. 7

[58] Field of Search ..... 92/88, 168; 277/DIG. 7, 277/237 R; 403/381, 354

[56] References Cited

U.S. PATENT DOCUMENTS

| | | | |
|---|---|---|---|
| 2,745,382 | 5/1956 | Heintzen | 92/88 |
| 3,019,813 | 2/1962 | Dommann | 92/88 |
| 3,312,504 | 4/1967 | Makinen | 403/354 |
| 4,103,912 | 8/1978 | Thome | 277/DIG. 7 |
| 4,164,893 | 8/1979 | Granbom et al. | 92/88 |
| 4,252,285 | 2/1981 | Hammond et al. | 92/88 |
| 4,313,609 | 2/1982 | Clements | 277/237 R |
| 4,351,620 | 9/1982 | Stritt et al. | 403/381 |
| 4,373,427 | 2/1983 | Garlapaty et al. | 92/88 |

FOREIGN PATENT DOCUMENTS

| | | | |
|---|---|---|---|
| 0033541 | 8/1981 | European Pat. Off. | 92/88 |
| 0846493 | 6/1952 | Fed. Rep. of Germany . | |
| 2162572 | 5/1976 | Fed. Rep. of Germany . | |

*Primary Examiner*—Robert E. Garrett
*Assistant Examiner*—Thomas Denion

[57] ABSTRACT

A pressure fluid cylinder without a piston rod and of the kind having a slotted cylinder tube (1) and a piston displaceable therein, said piston being connected to a movement transfer device, which extends radially through the slot. The slot is sealed axially on each side of the piston by means of internal and external sealing strips (31,32) consisting of a flexible sealing band (37,38) as well as retention means (44,45) extending into the slot and securing a releasable mechanical engagement with each other or, by friction, with the side walls of the slot.

13 Claims, 3 Drawing Sheets

SEALING DEVICE FOR A PRESSURE FLUID CYLINDER WITHOUT PISTON ROD

Matter enclosed in heavy brackets [ ] appears in the original patent but forms no part of this reissue specification; matter printed in italics indicates the additions made by reissue.

The invention relates to a sealing device for a pressure fluid cylinder without a piston rod.

Such pressure fluid cylinders without a piston rod with at least one internal sealing strip are known e.g. from U.S. Pat. No. 4,164,893 (Granbom) and EP No. 0033541 (Tol-O-Matic), wherein the internal sealing strip is retained in a position sealing the slot by magnetic attraction between the strip and the cylinder tube wall or permanent magnets inserted therein.

The object of the present invention is to achieve a reliable retention, guiding and engagement of at least the internal sealing strip in relation to the slot of the cylinder tube axially on each side of the piston, without the use of magnetic elements. The latter are unsuitable in many cases, i.e. in environments containing airborne magnetic particles, e.g. of ferromagnetic material. Such particles can be attracted by the magnets of the pressure fluid cylinder and cause operational disturbances. Other objects of the invention are to enable a simple design and manufacture of the slotted cylinder tube and to ensure a satisfactory sealing of the slot of the cylinder tube even under pressure build-up.

These and other objects are fulfilled by the according to which at least the internal sealing strip consists of a flexible sealing band, which is wider than the slot and engages with its edge portions sealingly against the cylinder tube at each transversal side of the slot, as well as retention means connected to the sealing band and extending into the slot between the side walls thereof and being in releaseable mechanical engagement with said side walls or with corresponding retention means of the opposite external or internal sealing strip. Hereby, a secure retention of the internal sealing strip against the inside of the cylinder tube adjacent the slot is obtained, so that the sealing result is effective, even under pressure build-up. The releaseable mechanical engagement is preferably achieved by means of zipper-like, mutually co-operating hook members on the two sealing strips.

The invention will be explained further below with reference to the appended drawings, illustrating three embodiments.

Figures 1, 2:
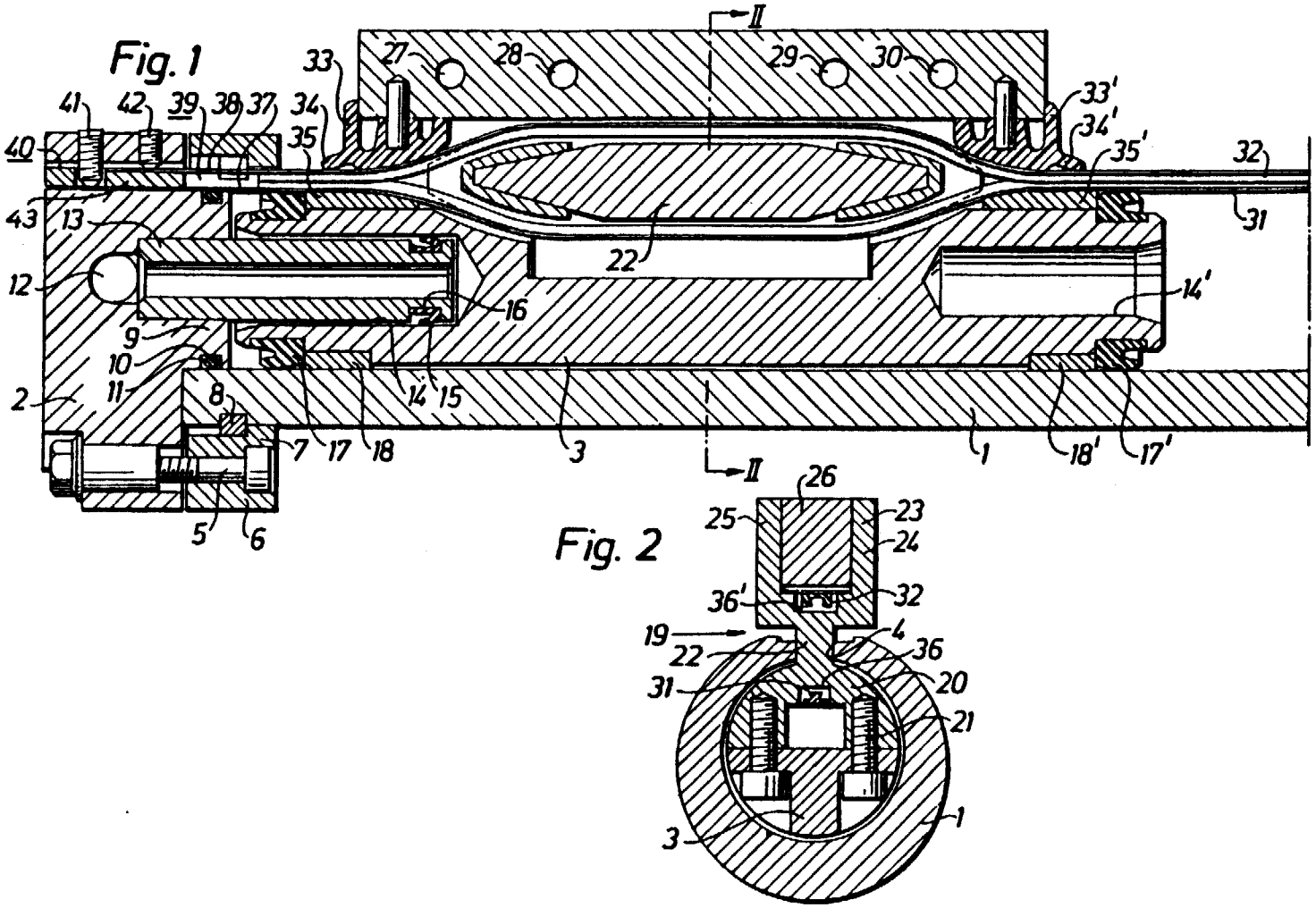
FIG. 1 shows a longitudinal section through a pressure fluid cylinder with a device according to the invention.
FIG. 2 shows a cross-section along the line II—II in FIG. 1.

In FIG. 1 there is shown in a longitudinal section one end portion of a working cylinder without a piston rod and consisting of a cylinder tube 1 with an upper longitudinal slot (in the sectional plane), an end cover 2 at each end of the cylinder tube 1 (only the left one is shown in FIG. 1) and a movable piston 3, which is operable by pressurized fluid along the cylinder tube between the end covers. As appears from FIG. 2, the wall thickness of the cylinder tube 1 is largest at the bottom of the figure and is gradually reduced on each side up to the slot 4 situated at the top. Hereby, in a manner known per se, it is achieved at the resistance to bending sideways varies uniformly with the bending momentum.

The end cover 2 is fastened by means of circumferentially distributed screw fasteners 5 against a holding ring 6, which is secured axially with an inner flange 7 against a locking ring 8 inserted in a groove in the external surface of the cylinder tube 1. The end cover 2 has a central cylindrical portion 9, which projects somewhat inwardly inside the end of the cylinder tube 1 and is sealed against the inside thereof by means of an O-ring 11 inserted into a circumferential groove 10. A connection port 12 for pressurized fluid formed in the end cover 2 communicates with a tubular sleeve 13 disposed centrally and extending along the axis of the cylinder tube 1 a portion inwardly from the end surface of the end cover 2, the tubular sleeve being dimensioned so as to extend, when the piston 3 is located in its corresponding end position, into a central bore 14 (and 14', respectively) in the corresponding end portion of the piston 3. Externally on the tubular sleeve 13, a lip sealing ring 15 serving as a check valve is inserted into an annular groove 16 adjacent to the free end of the tubular sleeve 13. By co-operation between the tubular sleeve 13 with the lip sealing ring 15, on the one hand, and the bore 14 of the piston 3, on the other hand, an end position damping of the piston movement is obtained by pressure build-up in the cylinder room outside the tubular sleeve 13 between the end cover 2 and the piston 3, which is sealed against the inside of the cylinder tube 1 by means of conventional piston seals 17, 17'. If desired, the damping effect can be set by an adjustable throttle in a connection channel (in the end cover 2) between the cylinder room and the connection port 12.

As mentioned above, the piston 3 is axially displaceable between the end covers 2 under the influence of pressurized fluid at either side. The piston 3 is guided against the inside of the cylinder tube by means of piston support rings 18, 18' of thermoplastic material, e.g. polyamide, disposed adjacent to the piston seals 17, 17' and providing a sliding fit with low friction.

Between its ends (see also FIG. 2), the piston 3 has a radially outwardly through the slot 4 of the cylinder tube extending portion 19, which serves as a movement transfer device, i.e. for transfer of movement and force between the piston 3 and an external, driven or driving element of some kind (not shown). The radially extending portion 19 consists of an elongated body having an inner, substantially half-cylindrical portion 20, which is fastened to the mid portion of the piston by means of screws 21 in a cut away part of the cylindrical piston body 3, an elongated narrow portion 22 dimensioned to extend through the slot 4 of the cylinder tube 1 and an outer, in section fork-like portion 23, the fork branches 24, 25 of which embracing a coupling member 26. The latter has transversal through holes 27,28,29,30, which also extend through the fork branches 24, 25 and permit a releasable connection of the driven or driving element, e.g. by means of screw fasteners.

The arrangement described so far is substantially previously known, e.g. from the EP No. 0033541 (Tol-O-Matic) mentioned above. According to the present invention, however, the slot 4 of the cylinder tube 1 is sealed axially at each side of the piston 3 in a novel and advantageous way. This is achieved, at the embodiment according to FIGS. 1–4, by means of flexible inner and outer sealing strips 31 and 32, respectively, which are in releaseable mechanical engagement with each other in the slot 4 axially on each side of the piston 3. In the region of the piston 3, the sealing strips 31,32 are guided in a way known per se by means of longitudinal recesses 36 and 36', respectively, in the inner and outer portions 20 and 23, respectively, of the movement transfer device 19. Adjacent to the ends of the piston 3, i.e. somewhat inside the respective piston seal 17, 17' the two sealing strips 31, 32 are guided and compressed into mutual engagement by means of outer guides 33, 33' secured to the ends of the coupling member 26 and produced by thermoplastic material and provide with scraper lips 34, 34', as well as inner guides or guide shoes 35,35' forming a part of the respective piston support rings 18, 18'. Axially inside these guides 33,33', 35,35' the sealing strips 31, 32 are separated wedge-like from each other in the longitudinal recesses 36,36' in the movement transfer device 19. The sealing strips are held longitudinally stretched in that they are secured in each cylinder end cover 2. Thus, ribbon-like portions 37 and 38, respectively, of the sealing strips 31, 32 extend through a recess 39 formed for this purpose in the holding ring 6 and further into a corresponding recess 40 in the end cover 2. A first locking screw 41 clamps the ribbon-like portion 37 of the inner sealing strip 31 against the end cover 2, and a second locking screw 42 clamps the outer ribbon-like portion 38 of the outer sealing strip 32 against an intermediate piece 43 inserted into the recess 40.

Figure 3:
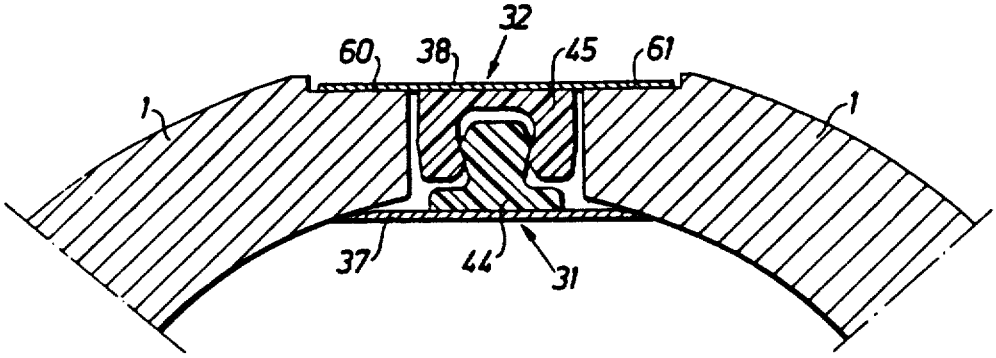
FIG. 3 shows in a larger scale a partial cross-section of the cylinder tube adjacent the slot with coupled internal and external sealing strips.
Figure 4:
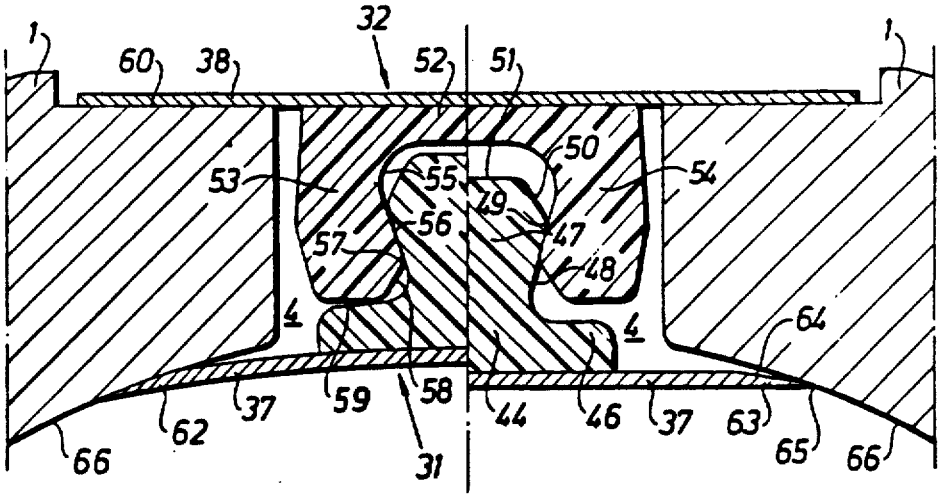
FIG. 4 shows the corresponding section as in FIG. 3 in an even larger scale, wherein the right half illustrates the sealing strips in a non-loaded state, i.e. without the influence of an internal fluid pressure, whereas the left half illustrates the sealing strips under the influence of an internal fluid pressure.

As shown in FIGS. 3 and 4, the sealing strips 31,32 comprise mutually releasably connectable hook elements 44 and 45, respectively, in a zipper-like manner, the hook elements engaging mechanically with each other axially at each side of the piston 3 in the slot 4. These hook elements 44, 45 can possibly be made in one piece with the wider, band-like portions 37 and 38, respectively, engaging internally and externally against the cylinder tube 1, but preferably they consist of separate members which are secured, e.g. by vulcanization, glueing or by some other method, to the respective ribbon-like portion 37,38 (denoted sealing bands 37,38 below). These sealing bands 37,38 are preferably made of a flexible, wear resistant and corrosion resistant metallic material, e.g. rustproof steel or beryllium bronze, whereas the hook elements 44,45 preferably consist of wear resistant elastic material with low friction and low modulus of elasticity, e.g. nitrile rubber or polyurethane. The hook elements 44, 45 can consist either of separate, along the length of the respective sealing band distributed members or hook profile elements extending continuously in the longitudinal direction. In the embodiment according to FIGS. 1–4, the latter alternative is chosen. The lower hook profile element 44 constitutes a male part with a base portion 46 and an upwardly directed, central bead 47,(see FIG. 4, the part to the right). From the base portion 46, the bead 47 is widened substantially rectilinearly 48 in cross-section to a point 49, from which the bead tapers off, likewise substantially rectilinearly 50, up to an upper, planar portion 51. The upper hook profile element 45 constitutes a female part and has approximately a complementary cross section as compared to the male part. From a base portion 52 (see also the left half of FIG. 4) two legs 53, 54 extend symmetrically on each side of the bead 47 of the lower hook profile element 45. Next to an inner, rounded part 55, there follows, in section, a substantially rectilinear part 56 down to a point 57, from which each leg tapers off likewise substantially rectilinearly 58 obliquely down to a planar lower surface 59.

The widest portion of the bead 47, e.g. at level with the point 49, is somewhat wider than the distance between the legs 53,54 at the level of the point 57. The bead 47, however, can be inserted between the legs 53,54 in that the latter are resiliently bent apart from each other when the oblique surfaces 50 of the bead 47 engage the likewise oblique surfaces 58. When the point 49 passes the point 57, the bead 47 will be brought further inwards somewhat because the legs 53, 54 will more resiliently back towards each other, whereas the points 57 (in the section according to FIG. 4) on each leg will move downwards along the parts 48 of the bead. To the right in FIG. 4, there is shown the relative position taken without influence of any overpressure within the cylinder tube 1, whereas the left half of FIG. 4 shows how the lower sealing strip 31, under the influence of the overpressure of the pressurized fluid inside the cylinder tube 1, is bent slightly upwards, while the upper sealing strip 32 remains in its position because the upper surface 51 of the bead 47 has a slight play to the base portion 52 of the upper hook profile element 45 (as does the base portion 46 of the lower hook profile element 44 relative to the lower surfaces 59 of the legs 53,54) and because the legs 53,54 has such resiliency and are so dimensioned in relation to the bead 47 that the legs 53,54 engage the bead 47 with some bias in the absence of a fluid pressure (the position to the right in FIG. 4) and move towards each other when an internal fluid pressure bends up the sealing band 37 to the position shown in the left half of FIG. 4. This means that the two hook profile elements 44,45 will come closer to each other, so that the upper sealing band 38 tends to retain its sealing engagement with the planar surfaces 60,61 of the cylinder tube externally at each side of the slot 4.

The described arrangement will ensure that the lower sealing band 37 constantly engages with its edge portions 62,63 against the internal cylindrical surface of the cylinder tube 1 adjacent the slot 4. The edge portions 62,63 are bevelled obliquely on the side facing the slot 4 (the upper side in FIGS. 3 and 4), and the bevelled edge surface 64 (see the right part of FIG. 4) will form an outer sharp edge 65. This edge 65 engages the internal cylinder surface 66 of the cylinder tube in the absence of an internal fluid pressure. Hereby, it is ensured that the lower sealing band 37 will seal the slot 4 already at the start when a working pressure is to be built up internally in the cylinder tube for actuating the piston 3. When the pressure increases, the sealing band 37 is bent upwardly and a gradually larger portion of the obliquely bevelled edge surface 64 will get in contact from the outside and inwardly, since the tapered portion closest to the the sharp edge has less resistance to bending than the rest of the band 37 which is uniformly thick. At full working pressure, the whole edge surface 64 will be bent so as to contact sealingly the cylinder surface 66, as appears from the left half of FIG. 4.

Figure 5:
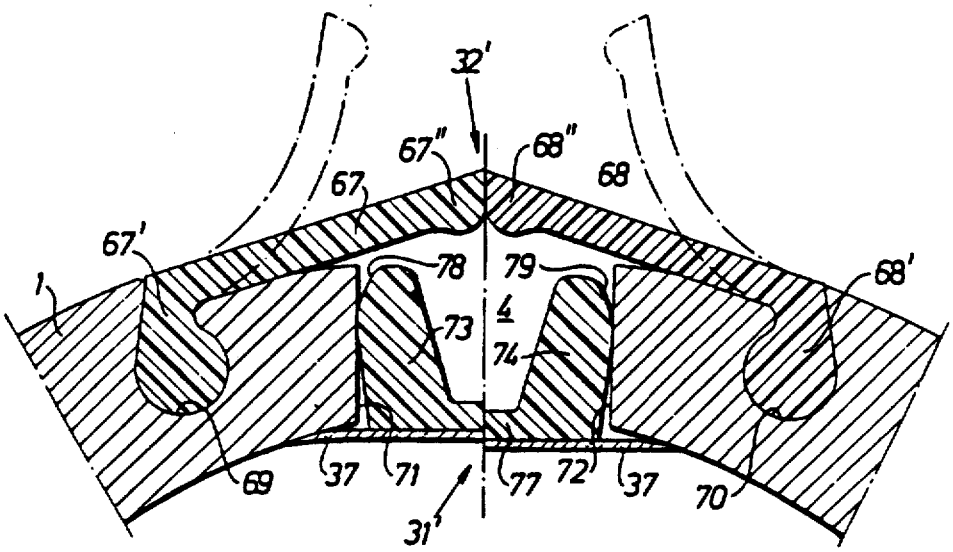
FIG. 5 is a view corresponding to FIG. 4 of a second embodiment of the two sealing strips.
Figure 6:
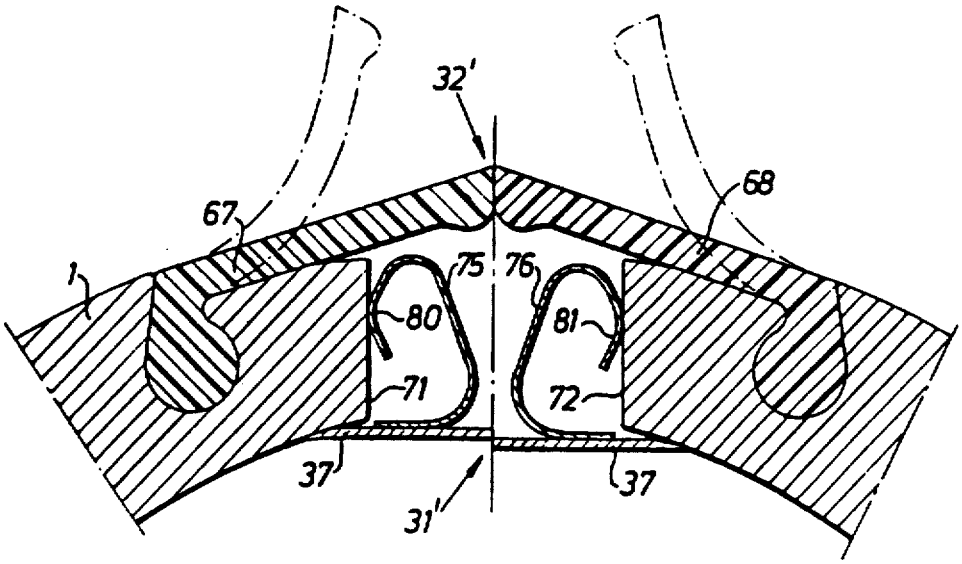
FIG. 6 is a view corresponding to FIGS. 4 and 5 of a third embodiment of the two sealing strips.

The two embodiments shown in FIGS. 5 and 6 differ from the preceding one in that the internal and external sealing strips are not directly coupled to each other. The upper sealing strip 32' is divided lengthwise at the middle and thus consists of two strip halves 67,68 of elastic material and arranged in parallel next to each other. The outer edge portion 67", 68" of each strip half is pressed down into a groove 69 and 70, respectively, at the outside of the cylinder tube 1 at the side of the slot 4, whereas the inner edge portions 67', 68' engage sealing against each other centrally above the slot 4. When the piston 3 with the movement transfer member 19 passes, the strip halves 67,68 are bent away from each other to the position shown in FIGS. 5 and 6 with dash-dotted lines.

The internal sealing strip 31' comprises, as in the preceding embodiment, a rather stiff but flexible sealing band 37 of metallic material. However, the retention elements secured thereto are not designed as hook elements, but as frictionally engaging elements 73,74 (FIG. 5) and 75,76 (FIG. 6), respectively, pressing sideways against the side walls 71,72 of of the slot 4. In the embodiment of FIG. 5, these frictionly engaging elements are made in one piece with a longitudinally continuous profile element having two legs 73,74 extending obliquely outwardly (upwards in FIG. 5) from a common base portion 77, which is secured to one side (the upper side in FIG. 5) of the sealing band. The profile element 73,74, 77 is preferably made of a wear resistant elastic material having a substantial friction against the cylinder tube material (normally aluminum), e.g. rubber or some synthetic elastomeric material with similar frictional qualities. The legs 73,74 are so dimensioned that upon being inserted into the slot 4 they engage with the side walls 71,72 with a certain bias, so that a desired frictional grip is obtained. Furthermore, they are provided with bevelled edges 78,79 at their free ends so as to facilitate the insertion into slot 4 (by means of the guides 35,35' of the piston 3 shown in FIG. 1).

According to FIG. 6, the friction engaging elements are instead made of longitudinally distributed, separate clamp elements 75,76 of a stiff, resilient band material, e.g. steel. These elements are secured in pairs on the sealing band 37 on the side facing the slot 4 and dimensioned to engage with a certain bias with a rounded, in section according to FIG. 6, substantially arcuate portion 80 and 81, respectively, against the respective side wall 71,72 of the slot. The bias ensures that a frictional engagement is retained even when the slot 4 is slightly widened under the influence of the pressure inside the cylinder tube 1. The same is true for the embodiment according to FIG. 5. Moreover, the engagement is facilitated in that the sealing band 37 is bent into arcuate form in cross section, so that the elements 73,74 and 75,76, respectively, are swung outwardly sideways.

In the embodiments according to FIGS. 5 and 6, the lower sealing strip 31' extends through the longitudinal recess 36 of piston 3 (see FIG. 2). The upper, divided sealing strip 32', however, is held outside the movement transfer member 19, and in this case no longitudinal recess 36' is needed.

The inventive device has many advantages. The absence of magnetic retaining means for the sealing strips will eliminate the risk of magnetically attracted particles being collected in and adjacent to the slot of the cylinder tube with accompanying operational disturbances. The mechanical retention according to the invention will also permit lower production costs in that special recesses for magnets are unneccessary. Likewise, the assembly work is facilitated. The cylinder tube can be made with a uniform, cylindrical internal surface without radial differences, and a slot can be formed with straight side walls. The material of the sealing band can be chosen at will, since it does not have to posses magnetic qualities.

By forming at least the internal sealing strip with a relatively wide sealing band and retention members secured thereto and extending in between the side walls of the slot, an excellent sealing between the edge portions of the sealing band and the cylinder surface as well as a secure retention and guiding of the retention members inside the slot are obtained. This is of great importance in those cases where the cylinder is exposed to vibration or other movements which may displace the sealing strips from their sealing positions. The embodiment according to FIGS. 1–4 with zipper-like, mutually engaging hook elements provides for an especially good retention.

I claim:

1. A sealing device for a pressure fluid cylinder without a piston rod and of the kind comprising a cylinder tube (1) having a longitudinal slot (4), end covers (2) closing [the] ends of said cylinder tube, a piston (3) axially movable in said cylinder tube, and operable by pressurized fluid, and a movement transfer device (19) connected to said piston extending substantially radially outwards through said slot, said device including an internal flexible sealing strip (31') having side edges and arranged to seal the slot from the inside axially on each side of the piston, said internal sealing strip comprising a flexible sealing band (37) which is wider than the slot and engages with its [edge portions] *side edges* sealingly against the cylinder tube at each transversal side of the slot, and retention means (73, 74; 75, 76) secured to the sealing band *and* extending into the slot between [the] side walls (71, 72) thereof and being in releasable mechanical engagement with said side walls, said retention means including a pair of legs affixed to said sealing strip at locations spaced from the side edges of said sealing strip and extending obliquely therefrom to diverge away from each other toward the strip side edges [for] *and* being located [with] *within* the slot, each leg having a portion which engages an associated side wall inside the slot and spaced inwardly of the strip side edges so that the outwardly directed legs engage the side walls at an angle for exerting a force against such associated side walls which increases as the sealing strip flexes into the slot under influence of pressure from within the cylinder tube.

2. A device as defined in claim 1, [characterized in that] *wherein* said retention means comprise elements (75, 76) distributed longitudinally along the sealing strip (37).

3. A device as defined in claim 1, [characterized in that] *wherein* said retention means comprise a continuous profile element (73, 74, 77).

4. A device as defined in claim 1, [characterized in that the edge portions] *wherein the side edges* of the sealing band (37) of the internal sealing strip (31') are bevelled into a sharp edge on the side of the sealing band facing the slot (4) of the cylinder tube (1).

*5. A sealing device for a pressure fluid cylinder without a piston rod and of the kind comprising a cylinder tube having a longitudinal slot, end covers closing ends of said*

*cylinder tube, a piston axially movable in said cylinder tube and operable by pressurized fluid, and a movement transfer device connected to said piston extending substantially radially outwards through said slot, said device including an internal flexible sealing strip having side edges and arranged to seal the slot from the inside axially on each side of the piston, said internal sealing strip comprising a flexible sealing band which is wider than the slot and engages with its side edges sealingly against the inside of the cylinder tube at each transversal side of the slot, and a profile member being made of elastomeric material, said profile member including a base portion, which is secured to the sealing band centrally between said side edges thereof, and which is narrower than the slot so as to be freely insertable radially into the slot between side walls thereof, and a retaining portion, which is located radially outwardly of said base portion and comprises a pair of legs which diverge transversally away from said base portion, each leg having an external portion which resiliently engages an associated side wall of the slot at a location spaced radially outwardly from said sealing band so as to mechanically retain the profile member in a position within the slot and thereby hold the sealing band in sealing engagement with the inside of the cylinder tube.*

*6. A sealing device as defined in claim 5, wherein said profile member is continuous.*

*7. A sealing device as defined in claim 5, wherein said legs extend obliquely outwardly from said base portion.*

*8. A sealing device as defined in claim 5, wherein said legs engage with bias against the side walls of the slot so as to exert a retaining frictional grip.*

*9. A sealing device as defined in claim 5, wherein said side edges of said flexible sealing band are bevelled into a sharp edge on the side of the sealing band facing said slot.*

*10. A sealing device as defined in claim 5, wherein said profile member is glued or vulcanized onto said sealing band.*

*11. A sealing device as defined in claim 5, wherein said sealing band consists of a flexible wear resistant and corrosion resistant material.*

*12. A sealing device as defined in claim 11, wherein said wear resistant and corrosion resistant material is a metallic material.*

*13. A sealing device as defined in claim 5, wherein said legs are provided with bevelled edges at their free ends so as to facilitate the insertion of said profile member into said slot.*

* * * * *